United States Patent Office 3,384,565
Patented May 21, 1968

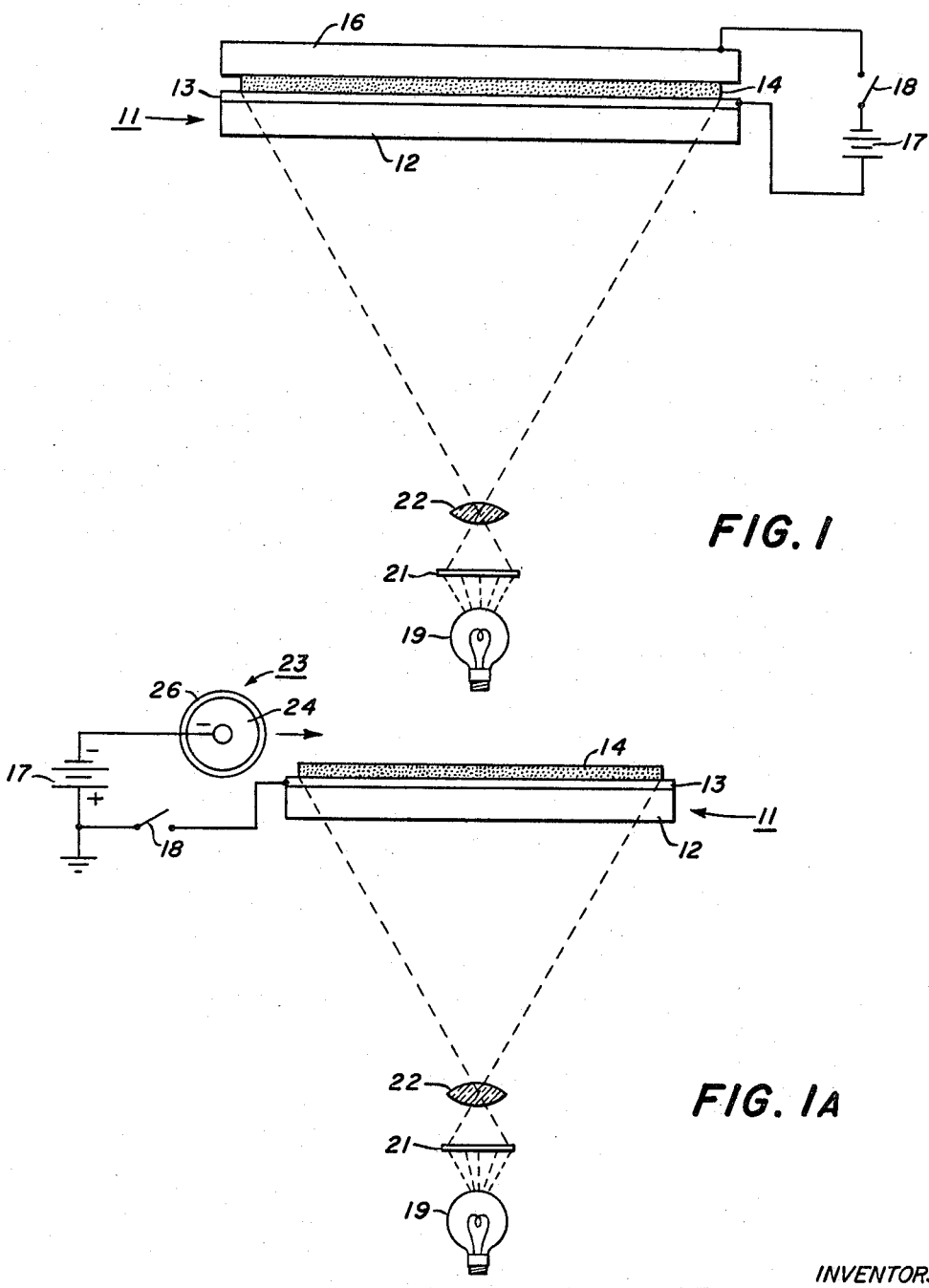

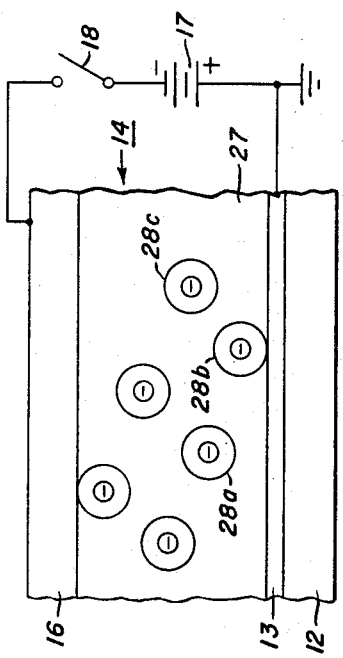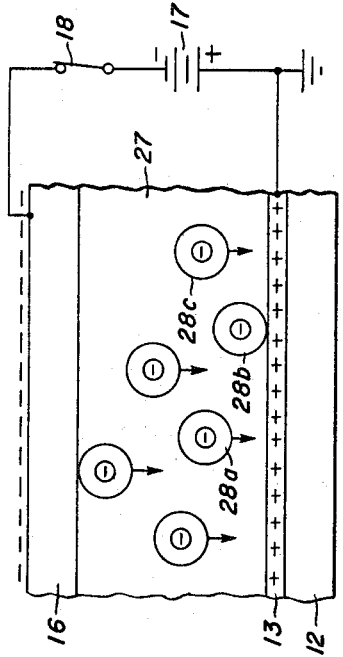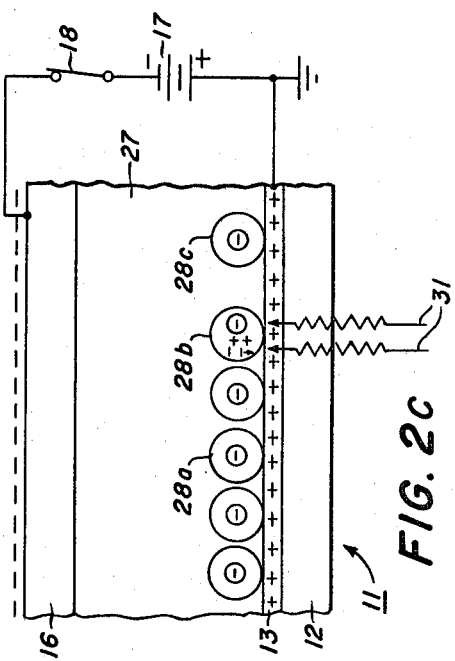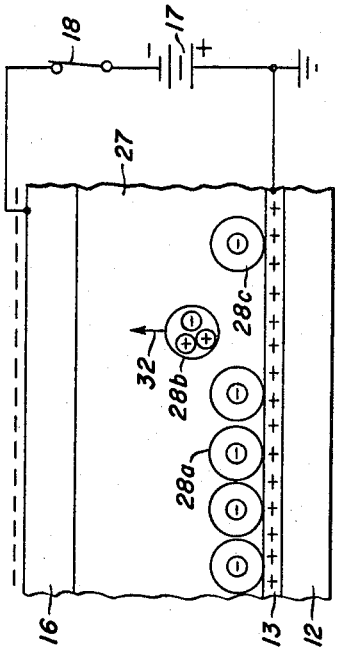

3,384,565
PROCESS OF PHOTOELECTROPHORETIC
COLOR IMAGING
Vsevolod Tulagin and Leonard M. Carreira, Rochester,
N.Y., assignors to Xerox Corporation, Rochester, N.Y.,
a corporation of New York
Filed July 23, 1964, Ser. No. 384,737
16 Claims. (Cl. 204—181)

ABSTRACT OF THE DISCLOSURE

An electrophoretic polychromatic imaging system is disclosed. In this system, a suspension made up of a plurality of different colored electrically photosensitive particles is dispersed in a carrier liquid, the suspension is placed between a pair of electrodes, at least one of which is at least partially transparent, an electric field is imposed across the suspension and an image is projected on the suspension through the transparent electrode. Upon separation of the electrodes, a polychromatic image made up of migrated particles is observed on at least one of said electrodes.

---

This invention relates in general to a novel imaging system and more specifically, to an imaging system based on the phenomenon of photoelectrophoresis.

Although many photographic systems are known today, all suffer from one shortcoming or another. For example, some require expensive and complex initial preparation of the photosensitive media while others suffer from deficiencies in resolution capabilities, photographic speeds, spectral sensitivity and the like. In addition to the aforementioned shortcomings of many of the present-day photographic systems, additional processing is generally required to produce a visible image from the latent image produced on the photosensitive media after its exposure to light.

When present-day photographic systems are employed for the production of color images, the complexity of material and processing steps is further increased to an almost unbelievable extent. Not only are much more complex multi-layer photosensitive recording media required, often times containing as many as seven to nine very thin layers of different material of varying chemical complexity but, in addition, processing of the materials requires a great number of additional steps and careful control of each of these steps becomes much more critical than with the ordinary black and white systems.

Now in accordance with the present invention, there is described an imaging system in which variously colored light absorbing particles which are believed to bear a charge when suspended in a nonconductive liquid carrier are suspended in such a liquid, placed in an electrical system with a voltage applied and exposed to an image. When these steps are completed, particle migration takes place in image configuration providing a visible image at one or both of the electrodes. The system employs as the only component of the particles intensely colored pigments which are themselves photosensitive and which apparently undergo a net change in charge polarity upon exposure to activating radiation by interaction with one of the electrodes. No other photosensitive elements or materials are required, making for a very simple and inexpensive imaging technique. The images are produced in color because mixtures of two or more differently colored pigments which are each sensitive only to light of a specific different wavelength or narrow range of wavelengths are used. It has been found that the particles respond in the regions of the spectrum of their principal light absorption, with the cyan, magenta and yellow particles responding to red, green, and blue light respectively. Obviously, this makes the system the most basic and ideal, possible for subtractive color synthesis.

Although color imaging systems based on particle migration techniques have been suggested in the prior art as described in U.S. Patent 2,940,847 to Kaprelian, these systems have proven so light insensitive and deficient in color rendition and employ such difficult to manufacture imaging particles that they have never been accepted commercially. This situation resulted because the prior art particles employed conventional photoconductors having for the most part relatively wide (even panchromatic) spectral response or photoconductors dye-sensitized to this condition regardless of the color of the photoconductor and then superimposed at least one additional colored layer over the photoconductor. This colored layer was used to simultaneously provide a light filtering action, thus making the particle spectrally selective in its response and imparting the proper color to the particle. Although some prior art particles included additional layers of materials, even the simplest particles produced poor results because the two functions of the colored layer are incompatible and at best, its characteristics must be selected by compromise. On the one hand, the layer should have high optical density to act as a good final image colorant while on the other hand, high density tends to decrease even further the light transmission efficiency of the layer as a filter. In the system of the present invention, it has now been found, quite unexpectedly and surprisingly, that with a large number of photosensitive pigment particles such filter layers are completely unnecessary and are, in fact, undesirable because they reduce system sensitivity. Instead, it has been found that the natural selective spectral light absorption which imparts the appearance of color to each of the differently colored particles also serves to cause them to move in the imaging system of the invention.

Accordingly, it is an object of this invention to define a novel and extremely uncomplicated imaging system.

An additional objective of the invention is to define a novel imaging system capable of direct positive imaging.

Still another objective of the invention is to define a novel, imaging system for producing images in color by polychromatic color synthesis with a theoretically ideal lack of complexity.

Yet a further objective of this invention is to describe novel imaging compositions useful in the system of the aforesaid objectives.

A still further objective of the invention is to provide for a novel apparatus for producing one-step direct positive images in color.

The above and still further objects, features, and advantages of the present invention will become apparent upon consideration of the following detailed disclosure of the invention; especially when taken in conjunction with the accompanying drawings where:

FIGS. 1 and 1a are side views of simple exemplary systems for carrying out the steps of the invention;

FIGS. 2a, 2b, 2c, and 2d are broken side diagrammatic views of consecutive occurrences which take place during the operation of the imaging process.

The sizes and shapes of elements of the drawings should not be considered as actual sizes or even proportional to actual sizes because many elements have been purposely distorted in size or shape in order to more fully and clearly describe the invention.

Referring now to FIGURE 1, there is seen a transparent electrode generally designated 11 which, in this exemplary instance, is made up of a layer of optically transparent glass 12 overcoated with a thin optically transparent layer 13 of tin oxide commercially available under the name NESA glass. This electrode shall hereafter be referred to as the injecting electrode. Coated on the surface of injecting electrode 11 is a thin layer of finely divided photosensitive particles dispersed in an insulating liquid carrier. During this initial part of the description of the invention, the term "photosensitive" may be thought of as any particle which, once attracted to the injecting electrode will migrate away from it under the influence of an applied electric field when it is exposed to actinic electromagnetic radiation; however, a detailed theoretical explanation of the apparent mechanism of operation of the invention is given below. The liquid suspension 14 may also contain a sensitizer and/or a binder for the pigment particles which is at least partially soluble in the suspending or carrier liquid as will be explained in greater detail hereinafter. Above the liquid suspension 14 is a second electrode 16 which is connected to one side of the potential source 17 through a switch 18. The opposite side of potential source 17 is connected to the injecting electrode 11 so that when switch 18 is closed an electric field is applied across the liquid suspension 14 from electrodes 11 and 16. An image projector made up of a light source 19, a transparency 21, and a lens 22 is provided to expose the dispersion 14 to a light image of the original transparency 21 to be reproduced. It should be noted at this point that injecting electrode 11 need not necessarily be optically transparent but that instead electrode 16 may be optically transparent and exposure may be made through it from above as seen in FIGURE 1.

The embodiment shown in FIGURE 1a uses identical numerals to identify identical parts of the device and is the same as the FIGURE 1 embodiment of the invention except for the fact that electrode 16 is made in the form of a roller 23 having a conductive central core 24 connected to the potential source 17. The core is covered with a layer of a blocking electrode material 26, which may be baryta paper. In both the FIGURE 1 and FIGURE 1a embodiments of the invention, the pigment suspension is exposed to the image to be reproduced while potential is applied across the blocking and injecting electrodes by closing switch 18. In the FIGURE 1a embodiment of the invention, roller 23 is caused to roll across the top surface of injecting electrode 11 with switch 18 closed during the period of image exposure. This light exposure causes exposed pigment particles originally attracted to electrode 11 to migrate through the liquid and adhere to the surface of the blocking electrode, leaving behind a pigment image on the injecting electrode surface which is a duplicate of the original transparency 21. In the FIGURE 1 embodiment of the invention, the blocking electrode 16 may then be removed from the surface of the pigment suspension 14 whereupon the relatively volatile carrier liquid evaporates off leaving behind the pigment image. This pigment image may then be fixed in place as, for example, by placing a lamination over its top surface or by virtue of a dissolved binder material in the carrier liquid such as paraffin wax or other suitable binders that come out of solution as the carrier liquid evaporates. 3–6% by weight of paraffin binder in the carrier has been found to produce good results. The carrier liquid itself may be molten paraffin wax or other suitable binder in a liquid state which is self-fixing upon cooling and return to the solid state. In the alternative, the pigment image remaining on the injecting electrode may be transferred to another surface and fixed thereon. As explained in greater detail below, the system can produce either monochromatic or multichromatic images depending upon the type and number of pigments suspended in the carrier liquid and the color of light to which the suspension is exposed in the process.

FIGURES 2a through 2d show in detail a proposed theoretical operating mechanism for the system with the pigment particle size and carrier liquid thickness greatly exaggerated for purposes of illustration. Since the system has been experimentally shown to be operative, there is, of course, no intention to limit the invention to this theory of operation which is only given to clarify it. In these figures, like numerals have been used to identify parts of the system which are identical with those in FIGURES 1 and 1a. Referring now to FIGURE 2a, it is seen that the pigment dispersion generally identified as 14 consists of the insulating carrier liquid 27 having charged pigment particles 28a, 28b, 28c etc. suspended therein. The pigment particles 28 bear a net electrostatic charge when suspended in the carrier liquid 27 which is believed to be related to the triboelectric relationship of the particles and liquid. The charges are trapped or bound either within the body of the pigment particles or at their surfaces. The net charge on the particles may be either positive or negative; however, in this instance, an encircled negative charge in each pigment particle has been employed to diagrammatically indicate that trapped negative charge carriers give that particular particle a net negative electrostatic charge. When switch 18 is left in the open condition and no potential is applied across electrodes 11 and 16 in the system as seen in FIGURE 2a, the suspended particles 28 merely assume random positions in the liquid carrier 27. However, when switch 18 is closed, thereby rendering the conductive surface 13 of electrode 11 positive with respect to the back surface of blocking electrode 16, negatively charged particles within the system tend to move toward electrode 11 while any positively charged particles in the system would move toward blocking electrode 16. The existence of any positively charged particles within the system and their movement therein will temporarily be disregarded so as to facilitate the explanation of the movement of negatively charged particles in the carrier liquid. Since the pigment particles 28 are, in the absence of actinic radiation, nonconductive, they come down into contact with or closely adjacent to injecting electrode 11 and remain in that position under the influence of the applied electric field until they are subjected to exposure to activating electromagnetic radiation. In effect then, these particles are bound at the surface of the injecting electrode 11 until exposure takes place, because particles 28 are sufficiently nonconductive in the suspension in their unexposed condition to prevent the injection of positive charge from the surface 13 of the electrode 11 into them. Particles bound on the surface 13 make up the potential imaging particles for the final images to be reproduced thereon.

When photons of light such as 31 in FIGURE 2c are produced as, for example, by the projector which exposes the system to the image being reproduced, they are absorbed by the photosensitive pigment particle 28b and "create" hole-electron pairs of charge carriers within the particle by raising them to a conductive energy band. Since the charge carriers are newly formed by the photons of light 31, as shown in FIGURE 2c, they have not had a chance to become trapped in charge traps within the body of the pigment particle 28b as was the encircled negative charge carrier. Accordingly, these newly formed charge carriers may be considered as mobile in nature and have been represented by unencircled plus and minus signs. Since an electric field is applied across the particles by the potential applied across electrode 16 and conductive surface 13 of electrode 11, the hole-electron pairs created within these particles are caused to separate before they can recombine, with negative charge carriers moving towards surface 13 while positive charge carriers move up toward electrode 16. Since the charge carriers as initially formed are in a mobile condition, the negative charge carriers near the pigment-electrode interface can move across the very short distance out of the pigment particle 28b to the surface 13 as indicated by the small arrow, leaving the pigment particle with a net positive charge. Since particle 28b now carries a net positive charge, it is repelled away by the positive surface 13 of electrode 11 and attracted to negative blocking electrode 16, moving as indicated by arrow 32 in FIGURE 2d. Accordingly, all particles such as 28b on the surface 13 which are exposed to electromagnetic radiation of a wavelength to which they are sensitive (that is to say, a wavelength which will cause the formation of hole-electron pairs within the particles) move away from surface 13 up to the surface of electrode 16, leaving behind those particles such as 28c which are either not exposed at all or not exposed to electromagnetic radiation to which they are sensitive. Consequently, if all particles in the system are sensitive to one wavelength of light or another and the system is exposed to an image with white light, a positive image will be formed on the surface of electrode 13 by the subtraction of bound particles from its surface in exposed areas leaving behind bound particles in unexposed areas. The system is also capable of creating a photographically negative image on surface 16 since only particles in exposed areas move up to that surface. As particles such as 28b move up through the liquid carrier 27 from surface 13 towards electrode 16, it is believed that the new charge carriers enter charge carrier traps and this has been indicated diagrammatically by showing the holes enclosed within circles in FIGURE 2d. Accordingly, the particle now contains one trapped electron and two trapped holes giving it a net charge of plus 1.

As should be clear at this point in the disclosure, there are certain preferred properties for electrodes 11 and 16. These are that electrode 11 will preferably be capable of accepting injected electrons from bound particle 28b when it is exposed to light so as to allow for a net change in the charge polarity on the particle and that electrode 16 will preferably be a blocking electrode which is incapable of injecting electrons into particle 28b at more than a very slow rate when it comes into contact with the surface of the electrode 16. Obviously, if all polarities in the system are reversed, electrode 11 will preferably be capable of accepting injected holes from bound particles upon exposure to light and electrode 16 would preferably be a blocking electrode incapable of injecting holes into the particles at more than a very slow rate when they come into contact with the surface of this electrode. In this preferred embodiment, electrode 11 may be composed not only of conventional conductive materials such as tin oxide, copper, copper iodide, gold or the like but may also include many semiconductive materials such as raw cellophane which are not ordinarily thought of as conductors but which are still capable of accepting injected charge carriers of the proper polarity under the influence of the applied field. Even highly insulating materials such as polytetrafluoroethylene may be placed over the surface of the "injecting" electrode and still be operative because charge which leaves the particles initially bound on this surface upon exposure to light can merely move out of the particles and remain on the insulating surface thereby allowing the exposed particles to migrate. However, the use of the more conductive materials is preferred because it allows for cleaner charge separation in that charge leaving the particles upon exposure can move into the underlying surface and away from the particle in which it originated. This also prevents possible charge build-up on the electrode which might tend to diminish the interelectrode field. On the other hand, the preferred embodiment of the blocking electrode 16 is selected so as to prevent or greatly retard the injection of electrons (or holes, depending upon the initial polarity of charge on the particle) into particle 28b when it reaches the surface of this electrode. Accordingly, the surface of this electrode facing carrier liquid 27 in the preferred embodiment may be either an insulator or a semiconductor which will not allow for the passage of sufficient charge carriers under the influence of the applied field to discharge the particles finally bound to it, thereby preventing particle oscillation in the system. Even if this blocking electrode will allow for the passage of some charge carriers through it to the particles, it will still be considered to come within the class of preferred materials if it does not allow for the passage of sufficient carriers to recharge the particle to the opposite polarity because even a discharged particle will tend to adhere to this blocking electrode by Van der Waals forces. Here again, materials not coming within the preferred class may be employed but they tend to lead to particle oscillation in the system, resulting in lower image density, poorer image resolution image reversal and similar deficiencies, with the degree of these deficiencies, in most instances depending upon how far the material employed deviates from the preferred class of materials in its electrical characteristics. Baryta paper and other suitable materials may be employed to surface the blocking electrode and may be wet on their back surfaces with tap water or coated on these back surfaces with electrically conductive materials. Baryta paper consists of a paper coated with barium sulfate suspended in a gelatin solution. The terms "blocking electrode" and "injecting electrode" should be understood and interpreted in this context throughout the specification and claims. As described in greater detail hereinafter, the system may be operated with suspensions of particles which initially take on a net positive charge, or a net negative charge, and even with systems where the particles in suspensions apparently take on both polarities of charge.

Although the following insulating carrier liquids are operative in the system; decane, dodecane, N-tetradecane, molten paraffin, molten beeswax or other molten thermoplastic materials, Sohio odorless solvent, (a kerosene fraction available from Standard Oil Company of Ohio) and Isopar G (a long chain saturated aliphatic hydrocarbon available from Humble Oil Company of New Jersey), any suitable insulating liquid may be used. The particular voltage employed in the system is not critical and good quality images have been produced, for example, with voltages ranging from 300 to 5000 volts in the FIGURE 1a apparatus.

In this polychromatic system, the particles are selected so that those of different colors respond to different wavelengths in the visible spectrum corresponding to their principal absorption and further so that their spectral response curves do not have substantial overlap, thus allowing for color separation and subtractive multi-color image formation.

Several different particles are employed; namely, a cyan colored particle sensitive mainly to red light, a magenta colored particle sensitive mainly to green light, and a yellow colored particle sensitive mainly to blue light. While this is the simplest combination, additional particles having different absorption maxima may be added to improve color synthesis. When mixed together in the carrier liquid, these particles produce a black liquid and when one or more of the particles are caused to migrate from base electrode 11 towards an upper electrode, they leave behind particles which produce a color equivalent to the color of the impinging light source. Thus, for example, red light exposure causes the cyan colored pigment to migrate thereby leaving behind the magenta and yellow pigments which combine to produce red in the final image. In the same manner, blue and green colored light is reproduced by removal of yellow and magenta respectively, and, of course, when white light impinges upon the mix, all pigments migrate leaving behind the color of the white or transparent substrate. No exposure leaves behind all pigments which combine to produce a black image. It should be recognized that this is an ideal technique of subtractive color imaging in that the particles are not only each composed of but one component but, in addition, they perform a dual function in that they act both as the final image colorant and the photosensitive medium of the system. Accordingly, the system represents virtually the ultimate in eliminating the complexity of prior art methods of subtractive color imaging.

It is desirable to use pigment particles which are relatively small in size because smaller particles produce better and more stable pigment dispersions in the liquid carrier and, in addition, are capable of producing images of higher resolution than would be possible with particles of larger sizes. Even where the pigments are not commercially available in small particle sizes, the particle size may be reduced by conventional techniques such as extended ball milling of the like. When the particles are suspended in the liquid carrier, they may take on a net electrostatic charge so that they may be attracted towards one of the electrodes in the system depending upon the polarity of this charge with respect to that of the electrodes. It is not necessary that the particles take on only on polarity of charge but instead the particles may be attracted to both electrodes. Some of the particles in the suspension initially move towards the "injecting" electrode while others move towards the "blocking" electrode with this type of system; however, this particle migration takes place uniformly over the whole area covered by the two electrodes and the effect of imagewise, exposure-induced migration is superimposed upon it. Clearly then, the apparent bipolarity of the suspensions in no way affects the imaging capability of the system except for the fact that it subtracts some of the particles uniformly from the system before imagewise modulation of the particle migration takes place. In other words, the above behavior causes a portion of the suspended particles to be removed from the system as potential image formers. The effective subtraction of some of these particles as potential image formers in the system is easily overcome by merely forming an initial suspension of particles containing a sufficiently high particle concentration so that the system is still capable of producing intense images. It also has been found that with some suspensions of this type, either polarity of potential may be applied to the electrodes during imaging.

Although some of the photosensitive pigment materials used in this invention may be used in conventional structures working on a photoconductive principle, it is believed that a different type of photoresponsive mechanism is involved because it has generally been found that spectral response of the materials is much narrower and their sensitivity is much higher when they are used in the liquid carrier structure of this invention than when they are used in other modes involving photoconductive response.

Any suitable different colored photosensitive pigment particles having the desired spectral responses may be used to form the pigment mix in the carrier liquid for color imaging. The photosensitive pigment may, for example, be polymeric in nature. The percentage of pigment in the insulating liquid carrier is not critical; however, for reference purposes, it is noted that from about 2 to about 10% pigment by weight have been tested and produce good results.

As stated above, once the particle image is formed on one of the electrodes, it may be fixed thereon as by spraying a binder on it, laminating an overlay on it or by including a binder in solution in the liquid suspending medium. In most instances, however, it will be found preferable to transfer the image from the electrode and fix it on another surface so that the electrode may be reused. Such a transfer step may be carried out by adhesive pickoff with an adhesive tape, such as Scotch brand cellophane tape or preferably by electrostatic field transfer. Electrostatic transfer may, for example, be carried out by carrying out the imaging procedure described in connection with FIGURE 1a and then passing a second roller over the particle image formed on electrode 11 held a potential opposite in polarity to that of the first electrode. If the second electrode roller is covered with baryta paper sleeve, this paper sleeve will pick up the complete image as the electrode rolls over it.

Although various electrode spacings may be employed, spacings of less than 1 mil and extending down even to the point where the electrodes are pressed together, as in the case of the roller electrode of FIGURE 1a, constitute a particularly preferred form of the invention in that they produce better resolution and vastly superior color separation results than is produced with wider spacings when these spacings are used with the above described voltages. This improvement is believed to take place because of the high field strength across the suspension during imaging.

The following illustrative examples are given to enable those skilled in the art to more clearly understand and practice the invention with Examples I–XXX defining the spectral response of a number of single pigment suspensions and modified suspensions and the following examples illustrating how selected pigments may be combined to make a color imaging mix.

EXAMPLES

All of the following examples were carried out in an apparatus of the general type illustrated in FIGURE 1a with the imaging mix 14 coated on a NESA glass substrate through which exposure was made. The NESA glass surface was connected in series with a switch, a potential source, and the conductive center of a roller having a coating of baryta paper on its surface. The roller was approximately 2½" in diameter and was moved across the plate surface at about 1.45 centimeters per second. The plate employed was roughly 3" square and was exposed with a light intensity of 1800 foot candles. Unless otherwise indicated, 7% by weight of the indicated pigment in each example was suspended in Sohio odorless solvent 3440 and the magnitude of the applied potential was 2500 volts. With all pigments which were received commercially with a relatively large particle size, the particles were ground in a ball mill for 48 hours to reduce size to make a more stable dispersion to improve the resolution of the final images. The exposure was made with a 3200° K. lamp through a 0.30 neutral density step wedge filter to measure the sensitivity of the suspensions to white light and then Wratten filters 29, 61 and 47b were individually superimposed over the light source in separate runs to measure the sensitivity of the suspensions to red, green, and blue light respectively.

The relative sensitivity or response figures given for the suspensions are derived from the number of steps of the step wedge filter which were discernible in the images made through this filter. Thus, where 1 step was visible in the image sensitivity was 1, where two were visible, it was 2, where 3 were visible, it was 4, where 4 were visible, it was 8, etc. Many were tested with line copy or continuous tone subjects and all so tested product good quality images with both types of subject.

Example I

Locarno Red X–1686, C.I. No. 15865, 1-(4'-methyl-5' - chloroazobenzene - 2' - sulfonic acid)-2-hydroxy-3-naphthoic acid, available from American Cyanamid, was ball milled, dispersed in Sohio solvent and tested for light sensitivity. The pigment showed the same response whether the roller was made positive or negative with respect to the NESA glass substrate. Relative sensitivity of the suspension to blue light was 2, to green light was 8, to red light was 0, and to white light was 32.

Example II

Watchung Red B, a barium of 1-(4'-methyl-5'-chloroazobenzene - 2' - sulfonic acid) - 2 - hydroxy - 3 naphthoic acid, C.I. No. 15865, available from Du Pont, was tested with positive potential applied to the roller. This pigment showed a sensitivity of 1 to blue light, of 4 to green light, of 0 to red light, and of 32 to white light.

Example III

Permagen Red L Toner 51–500, 1-(4'-methyl-5'-chloroazobenzene-2'-sulfonic acid)-2 - hydroxy - 3 - naphthoic acid, C.I. No. 15865, available from Collway Colors, was tested with both positive and negative applied potential on the roller and found to show the same response to the both applied potentials indicating bipolarity of the suspension. Response was as follows: 8 for blue light, 32 for green light, 0 for red light, and 64 for white light.

Example IV

Napthol Red B, 1-(2'-methoxy-5'-nitrophenylazo)-2-hydroxy-3''-nitro-3-naphthanilide, C.I. No. 12355, available from Collway Colors, was tested with positive potential applied to the rollers and shown to have the following response: to blue light 1, to green light 4, to red light 0, and to white light 16.

Example V

Duol Carmine, the calcium lake of an azo dye, 1-(4'-methylazobenzene - 2' - sulfonic acid) - 2 - hydroxy - 3-naphthoic acid, C.I. No. 15850, available from Du Pont, was tested with positive potential applied to the roller and shown to have the following sensitivity: to blue light 5, to green light 16, to red light 1, to white light 64.

Example VI

Bonadur Red B, an insolubilized azo dye, available from Collway Colors, was tested with positive potential applied to the roller. This pigment is a dye described in C.I. No. 15865 with hydrogen substituted for the sodium in the compound to insolubilize it. The dispersion showed the following sensitivity: to blue light 2, to green light 8, to red light 2, and to white light 64.

Example VII

Calcium Lithol Red, the calcium lake of an azo dye, 1 - (2' - azonaphthalene - 1' - sulfonic acid) - 2 - naphthol, C.I. No. 15630, available from Collway Colors, was tested with positive potental applied to the roller and showed a sensitivity of: 1 to blue light, 4 to green light, 0 to red light, and 16 to white light.

Example VIII

Indofast Double Scarlet Toner, a Pyranthrone-type pigment, available from Harmon Colors was tested with positive potential applied to the roller and showed a sensitivity of: 4 to blue light, 8 to green light, 0 to red light, and 32 to white light. The pigment is a polynuclear aromatic having the following chemical structure:

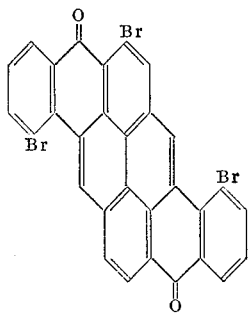

Example IX

Quindo Magenta RV–6803, a quinacridone-type pigment available from Harmon Colors having the following structure:

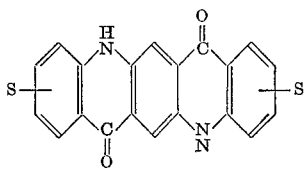

was tested with positive potential applied to the roller and shown to have a sensitivity of: 2 to blue light, 16 to green light, 0 to red light, and 128 to white light.

Example X

Indofast Brilliant Scarlet Toner, 3,4,9,10-bis (N,N'-(p - methoxyphenyl)-imido) - perylene, C.I. No. 71140, available from Harmon Colors was tested with positive polarity applied to the roller and shown to have a sensitivity of: 32 to blue light, 64 to green light, 0 to red light, and 128 to white light.

Example XI

Indofast Red MV–6606, a Thioindoxyle-type pigment having the following structure:

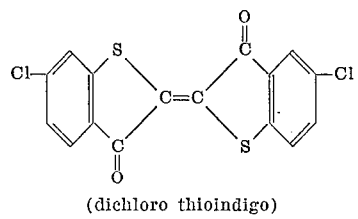

(dichloro thioindigo)

available from Harmon Colors was tested with positive potential applied to the roller and found to have a sensitivity of: 2 to blue light, 8 to green light, 0 to red light and 32 to white light.

Example XII

Vulcan Fast Red BBE Toner 35–2201, 3,3'-dimethoxy-4,4'-biphenyl-bis (1'' - phenyl-3''-methyl-4''-azo-2'''-pyrazolin-5''-one), C.I. No. 21200, available from Collway Colors was tested with both positive and negative polarities applied to the roller. With positive polarity, it showed a sensitivity of: 16 to blue light, 32 to green light, 0 to red light, and 64 to white light. With negative polarity applied to the roller, it showed a sensitivity of: 8 to blue light, 12 to green light, 0 to red light, and 32 to white light.

Example XIII

Reversal of the phenomena displayed with the suspension of Example XI was found to occur when a suspension of Pyrazolone Red B Toner, C.I. No. 21120 was tested with both positive and negative polarities applied to the roller. This suspension showed a sensitivity to white light of 16 with negative polarity applied and 4 with positive polarity applied.

Example XIV

Cyan Blue GTNF, the beta form of copper phthalocyanine, C.I. No. 74160, available from Collway Colors was tested with positive potential applied to the roller and found to have a response of: 1 to blue light, 1 to green light, 16 to red light, and 32 to white light.

Example XV

The alpha form of the Example XIV pigment, available under the trade name Cyan Blue XR was also tested with positive potential applied to the roller and found to have a sensitivity of: 1 to blue light, 4 to green light, 16 to red light, and 32 to white light.

Example XVI

Monolite Fast Blue G.S., the alpha form of metal-free phthalocyanine, C.I. No. 74100, available from Arnold Hoffman Company was tested with positive potential applied to the roller and found to have a sensitivity of: 1 to blue light, 8 to green light, 32 to red light, and 64 to white light.

Example XVII

The procedure of Example XVI was repeated except that 3 mol percent of 2,4,7-trinitro 9-fluorenone was added to the monolite fast blue suspension yielding a two times increase in the photographic speed of the suspension.

Example XVIII

The procedure of Example XVI was repeated except that 2 mol percent of benzonitrile was added to the suspension yielding a three times increase in the photographic speed of the suspension.

Example XIX

The example of XVI pigment was converted to the beta form by milling in O-Dichlorobenzene and found to have a sensitivity of: 1 to blue light, 4 to green light, 32 to red light, and 64 to white light with positive potential applied to the roller.

Example XX

Methyl Violet, a Phosphotungstomolybdic acid lake of a Triphenylmethane dye, 4-(N,N',N'-trimethylanilino) methylene-N'',N''-dimethylanilinium chloride, C.I. No. 42535, available from Collway Colors was tested with positive polarity on the roller and found to have a response of: 0 to blue light, 1 to green light, 1 to red light, and 8 to white light.

Example XXI

A suspension of Indofast Violet Lake, dichloro-9,18-isoviolanthrone, C.I. No. 60010, available from Harmon Colors was tested and with the rollers held at positive potential gave sensitivity readings of: 0 for blue light, 8 for green light, 0 for red light, and 32 for white light.

Example XXII

Diane Blue, 3,3'-methoxy-4,4'-diphenyl-bis(1''-azo-2''droxy-3''-naphthanilide), C.I. No. 21180, available from Harmon Colors was tested with the roller held at positive potential and found to have the following sensitivities: 0 for blue light, 1 for green light, 8 for red light, and 16 for white light.

Example XXIII

A Polychloro substituted Copper Phthalocyanine, C.I. No. 74260, from Imperial Color and Chemical Company was tested with the roller held at a positive potential and found to give the following response: 0 for blue, 0 for green, 16 for red, and 32 for white.

Example XXIV

A sample of Indanthrene Brilliant Orange R.K., 4,10-dibromo-6,12,-anthanthrone, C.I. No. 59300 from General Dye Stuffs was tested with negative polarity applied to the roller and found to have the following sensitivities: 4 for blue light, 16 for green light, 0 for red light, and 32 for white light.

Example XXV

Algol Yellow G.C., 1,2,5,6-di(C,C'-diphenyl)-thiazole-anthraquinone, C.I. No. 67300, available from General Dye Stuffs was tested with the roller held positive and found to have the following response: 2 to blue light, 0 to green light, 0 to red light, and 8 to white light.

Example XXVI

The procedure of Example XXV was repeated except that 2 mol percent of 2,4,7-trinitro, 9-fluorenone was added to the pigment suspension of algol yellow yielding a four times increase in the photographic speed of the suspension.

Example XXVII

Indofast Yellow Toner, flavanthrone, C.I. No. 70600, available from Harmon Colors, was tested with the roller being held positive and found to have the following response: 16 for blue light, 4 for green light, 0 for red light, and 64 for white light. With the roller held at negative potential, it was found to have the following response: 8 for blue light, 2 for green light, 0 for red light, and 32 for white light.

Example XXVIII

Indofast Orange Toner, a Benzimidazole-type pigment, C.I. No. 71105, available from Harmon Colors was tested with the roller held positive and found to have the following response: 0 for blue light, 8 for green light, 16 for red light, and 32 for white light.

Example XXIX

Light Cadmium Orange Concentrate, a cadmium selenide pigment, C.I. No. 77196, available from Imperial Color and Chemical was tested with the roller held negative and found to have the following response: 80 for blue light, 0 for green light, 20 for red light, and 160 for white light.

Example XXX 1-cyano-2,3 phthaloyl-7,8 benzopyrrocoline was synthesized according to the first technique given for its synthesis on page 1215 of the Mar. 5, 1957 issue of the Journal of the American Chemical Society in an article entitled, "Reactions of Naphthoquinones with Malonic Ester and its Analogs. III 1-substituted phthaloyl and Phthaloyl-benzopyrrocolines," by Pratt et al. This yellow compound was tested with the roller held negative and found to have the following response: 0 for red light, 8 for green light, 16 for blue light and 16 for white light.

Example XXXI

A suspension including equal amounts of Watchung Red B, as described in Example II, Monolite Fast Blue G.S., as described in Example XVI, and the yellow pigment of Example XXX in Sohio solvent was made up with the total pigment constituting about 8% by weight of the suspension. These pigments are magenta, cyan and yellow, respectively. This mixture, which shall be referred to as a trimix hereinafter, was coated on a NESA glass substrate and exposed under the same conditions as described above in connection with Example I except for the fact that a Kodachrome transparency was placed between the white light source and the NESA glass substrate so that a colored image was projected on to this trimix as the roller moved across the surface of the NESA glass substrate. Here again, a baryta paper blocking electrode was employed and the roller was held at a negative potential of about 2500 volts with respect to the substrate. The roller was passed over the substrate 6 times and was cleaned after each pass. After completion of the 6 passes, it was found that an excellent quality full-color image with all colors well separated was left behind on the substrate. Potential application and exposure were both continued during the entire period of the 6 passes by the roller.

Example XXXII

A suspension including equal amounts of Watchung Red B, Algol Yellow G.C., and Monolite Fast Blue G.S., in Sohio solvent was made up with total pigment constituting approximately 7% by weight. These pigments are magenta, yellow and cyan respectively. This mixture was coated on a NESA substrate and exposed under the same conditions as described above in connection with Example I except for the fact that a Kodachrome transparency was placed between the white light source and the NESA substrate so that a colored image was projected onto this trimix as the roller moved across the surface of the NESA substrate. Here again, a baryta paper blocking electrode was employed and the roller was held at a negative potential of 2500 volts with respect to the substrate. When the roller had passed over the surface of the substrate, it was found that a subtractive color image was left behind on the surface of the substrate. This experiment was also repeated employing cellophone in place of the baryta and a high quality color image was produced.

Examples XXXIII–XVIII

Six different pigment trimix suspensions were made up, each including equal amounts of three different pigments in the Sohio odorless solvent described above with the total pigment constituting about 7% weight of the suspension.

In Example XXXIII, the trimix was made up of Duol Carmine, as described above in Example V, Algol Yellow, as described above in Example XV, and Monolite Fast Blue, as described above in Example XVI.

In Example XXXIV, the trimix was made up of Watchung Red B, as described above in connection with Example II, Monolite Fast Blue G.S., as described above in connection with Example XVI, and Velvaglow Fluorescent pigment, available from Radiant Color Company, 830 Isabella St., Oakland 7, Calif.

In Example XXXV, the trimix was made up of Monolite Fast Blue G.S., as described in connection with Example XVI, Lemon Cadmium Yellow, C.I. No. 77196, a cadmium sulfide pigment, available from Imperial Color and Chemical Company, and Watchung Red B, as described in Example II.

The trimix of Example XXXVI was made up of Monolite Fast Blue G.S., as described in connection with Example XVI, Indofast Yellow Toner, as described above in connection with Example XXVII, and Watchung Red B, as described above in connection with Example II.

The trimix of Example XXXVII was made up of Cyan Blue Toner GTNF, as described above in connection with Example XIV, Algol Yellow, as described above in connection with Example XXV, and Watchung Red B, as described above in connection with Example II.

The trimix of Example XXXVIII was made up of Indofast Yellow Toner, as described above in connection with Example XXVII, Cyan Blue Toner, as described above in connection with Example XIV, and Watchung Red B, as described above in connection with Example II.

Each of these six trimixes was tested for imaging capabilities according to the technique described in Example XXXII and found to produce a good quality color image.

Example XXXIX

A trimix suspension was made up including equal amounts of Watchung Red B, as described in Example II, Monolite Fast Blue G.S., as described in Example XVI and the Yellow pigment of Example XXX in Sohio solvent with total pigment making up about 8% by weight of the suspension. The suspension was then tested according to the method of Example XXXII and found to produce a color image with all colors well separated.

Examples XL–XLII

In each of the following examples, a suspension including equal amounts of two differently colored pigments was made up in Sohio solvent with the total pigment constituting about 6% by weight of the suspension.

In Example XL, the pigments were Algol Yellow and Cyan Blue.

In Example XLI, the pigments were Watchung Red B and Cyan Blue Toner GTNF.

In Example XLII, the pigments were Watchung Red B and Monolite Fast Blue G.S.

The three two-pigment suspensions included yellow-cyan, magenta-cyan, and magenta-cyan pigments respectively and when they were exposed to two and three-color images containing blue and red, green and red, and green and red, respectively. accordingly to the technique of Example XXXII, they were found to produce two-color images of the blue and red, green and red, and green and red portions of the original images on the upper rollers of the imaging apparatus.

What is claimed is:

1. The method of photoelectrophoretic imaging comprising subjecting a layer of a suspension to an applied electric field between a pair of electrodes, at least one of which is at least partially transparent, said suspension comprising a plurality of at least two differently colored finely divided particles in a carrier liquid, each of said particles comprising an electrically photosensitive pigment whose principal light absorption band substantially coincides with its principal photosensitive response, said pigment being both the primary electrically photosensitive ingredient and the primary colorant for the particles, and substantially simultaneously exposing said suspension to an image through said transparent electrode with a source of activating electromagnetic radiation, whereby an image is formed.

2. The method of claim 1 wherein said electrodes are spaced up to about 1 mil apart during exposure.

3. The method of claim 1 including bringing said electrodes together to a spacing of up to about 1 mil while exposing said suspension.

4. The method of claim 1 wherein said carrier liquid has an adhesive binder dissolved therein.

5. The method of claim 1 further including the step of overcoating the image formed on said electrode.

6. The method of claim 1 including the further step of transferring said image from at least one of said electrodes to the surface of a transfer member.

7. The method of claim 1 wherein said electric field is applied while one of said electrodes is brought into rolling contact with the suspension on the other of said electrodes.

8. The method of claim 1 wherein from about 2 to about 10 parts by weight of said particles are dispersed in about 100 parts by weight of said carrier liquid.

9. The method of photoelectrophoretic color imaging comprising subjecting a layer of a suspension to an applied electric field between a pair of electrodes, at least one of which is at least partially transparent, said suspension comprising a plurality of finely divided particles in a substantially insulating carrier liquid, each of said particles comprising an electrically photosensitive pigment which is both the primary electrically photosensitive ingredient and the primary colorant for said particles, said suspension including cyan colored particles which are principally photosensitive to red light, magenta colored particles which are principally photosensitive to green light, and yellow colored particles which are principally photosensitive to blue light, while substantially simultaneously exposing said suspension to a light image through said transparent electrode and then separating said electrodes, whereby a particle synthesized subtractive color image is formed on an at least one of said electrodes.

10. The method of claim 9 wherein said electrodes are spaced up to about 1 mil apart during exposure.

11. The method of claim 9 including bringing said electrodes together to a spacing of up to about 1 mil while exposing said suspension.

12. The method of claim 9 wherein said carrier liquid has an adhesive binder dissolved therein.

13. The method of claim 9 further including the step of overcoating the image formed on said electrode.

14. The method of claim 9 including the further step of transferring said image from at least one of said electrodes to the surface of a transfer member.

15. The method of claim 9 wherein said electric field is applied while one of said electrodes is brought into rolling contact with the suspension on the other of said electrodes.

16. The method of claim 9 wherein from about 2 to about 10 parts by weight of said particles is disposed in about 100 parts by weight of said carrier liquid.

References Cited

UNITED STATES PATENTS

| | | | |
|---|---|---|---|
| 2,758,939 | 8/1956 | Sugarman | 96—1.4 X |
| 2,839,400 | 6/1958 | Moncrieff-Veates | 96—1.4 |
| 2,940,847 | 6/1960 | Kaprelian | 96—1 |
| 3,058,914 | 10/1962 | Metcalfe et al. | 252—62.1 |
| 3,145,156 | 8/1964 | Oster | 204—180 |
| 3,301,772 | 1/1967 | Viro | 204—2 |

NORMAN G. TORCHIN, *Primary Examiner.*

C. E. VAN HORN, *Assistant Examiner.*